United States Patent
Hwang et al.

(10) Patent No.: US 10,655,718 B2
(45) Date of Patent: May 19, 2020

(54) POWER TRANSMISSION SYSTEM OF VEHICLE

(71) Applicants: Hyundai Motor Company, Seoul (KR); Kia Motors Corporation, Seoul (KR)

(72) Inventors: Seong Wook Hwang, Gunpo-si (KR); Ki Tae Kim, Incheon (KR); Minho Chae, Incheon (KR); Ilhan Yoo, Hwasun-eup (KR); Juhyeon Park, Suwon-si (KR); Seongwook Ji, Gunpo-si (KR); Hyun Sik Kwon, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 22 days.

(21) Appl. No.: 16/189,398

(22) Filed: Nov. 13, 2018

(65) Prior Publication Data
US 2020/0063842 A1   Feb. 27, 2020

(30) Foreign Application Priority Data
Aug. 22, 2018   (KR) .......... 10-2018-0098117

(51) Int. Cl.
*F16H 37/08*   (2006.01)
*F16H 3/44*   (2006.01)

(52) U.S. Cl.
CPC ......... *F16H 37/0846* (2013.01); *F16H 3/44* (2013.01); *F16H 2200/0039* (2013.01); *F16H 2200/2005* (2013.01); *F16H 2200/2038* (2013.01)

(58) Field of Classification Search
None
See application file for complete search history.

(56) References Cited

U.S. PATENT DOCUMENTS

| | | | | |
|---|---|---|---|---|
| 4,467,670 A | * | 8/1984 | Kawamoto | .......... F16H 47/065 474/72 |
| 4,864,889 A | * | 9/1989 | Sakakibara | ......... F16H 37/0846 475/211 |

(Continued)

FOREIGN PATENT DOCUMENTS

JP   2017-219111 A   12/2017

*Primary Examiner* — Justin Holmes
(74) *Attorney, Agent, or Firm* — Morgan, Lewis & Bockius LLP (57) ABSTRACT

A power transmission system of a vehicle may include a CVT device having primary and secondary pulleys, a planetary gear set having first, second, and third elements, a first shaft connected to an engine and fixed to primary pulley, a second shaft fixed to secondary pulley, a third shaft fixed to first element, a fourth shaft fixed to second element and selectively connectable to first shaft and a transmission housing, a fifth shaft fixed to third element, a sixth shaft externally gear-meshed with second shaft, and a seventh shaft externally gear-meshed with third shaft and selectively connectable to sixth shaft, wherein first shaft is coaxially superposed with third, fourth, and fifth shafts, second, sixth, and seventh shafts are disposed in parallel with planetary gear set, and second, fifth, and sixth shafts, third and seventh shafts, and seventh shaft and a differential communicate torque through first, second, and third gear sets.

16 Claims, 3 Drawing Sheets

(56) References Cited

U.S. PATENT DOCUMENTS

| | | | | |
|---|---|---|---|---|
| 4,909,776 A | * | 3/1990 | Sakakibara | F16H 37/022 |
| | | | | 474/11 |
| 5,207,617 A | * | 5/1993 | Kato | F16H 61/66259 |
| | | | | 474/28 |
| 7,740,093 B2 | * | 6/2010 | Abe | B60K 6/365 |
| | | | | 180/65.6 |
| 2018/0335134 A1 | * | 11/2018 | Ohgata | F16H 61/12 |

* cited by examiner

| Shifting mode | | C1 | C2 | BK1 |
|---|---|---|---|---|
| Reverse(REV) | | | | ● |
| Forward (D) | Low speed(DL) | | ● | |
| | Medium speed(DM) | ● | ● | |
| | High speed(DH) | ● | | |

FIG. 3

POWER TRANSMISSION SYSTEM OF VEHICLE

CROSS-REFERENCE TO RELATED APPLICATION

The present application claims priority to Korean Patent Application No. 10-2018-0098117 filed on Aug. 22, 2018, the entire contents of which is incorporated herein for all purposes by this reference.

BACKGROUND OF THE INVENTION

Field of the Invention

The present invention relates to a power transmission system of a vehicle.

Description of Related Art

A transmission of a vehicle has a function for delivering engine torque to a drive wheel, and such transmission may be divided into a manual transmission in which a driver selects a desired shift speed by his own intension, an automatic transmission in which gear shifting is automatically performed depending on vehicle driving conditions, and a continuously variable transmission in which continuous shifting is performed among shift speeds.

In the above-mentioned transmission, the present invention relates to a continuously variable transmission having great advantages in fuel consumption, power delivery performance, and weight aspect by complementing drawbacks of an automatic transmission using hydraulic pressure, and a continuously variable transmission adopts a method varying diameters of pulleys mounted to an input shaft and an output shaft.

In such a continuously variable transmission, each of a primary pulley (input-side pulley) and a secondary pulley (output-side pulley) may include a fixed sheave and a moving sheave, where the moving sheave is driven by hydraulic pressure supplied from a hydraulic pressure chamber to sufficiently press a belt depending on a required transmission torque.

To achieve a large pulley ratio, sizes of the primary and secondary pulleys is required to be increased, causing a hydraulic pressure device to be also required to have higher capacity, which is a drawback of conventional CVT scheme.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a power transmission system of a vehicle having advantages of wide gear ratio span, reduction of pulley size, and reduction of required capacity of hydraulic apparatus.

An exemplary power transmission system of a vehicle may include a continuously variable transmission device having a primary pulley and a secondary pulley that are interconnected by a belt to continuously vary a pulley ratio, a planetary gear set having first, second, and third rotation elements, a first shaft connected to an engine output side and fixedly connected to the primary pulley, a second shaft fixedly connected to the secondary pulley, a third shaft fixedly connected to the first rotation element, a fourth shaft fixedly connected to the second rotation element and selectively connectable to the first shaft and a transmission housing, a fifth shaft fixedly connected to the third rotation element, a sixth shaft externally gear-meshed with the second shaft, a seventh shaft externally gear-meshed with the third shaft and selectively connectable to the sixth shaft, and a plurality of engagement elements disposed between a corresponding pair of the first to seventh shafts and the transmission housing. The first shaft may be coaxially superposed with the third shaft and the fourth shaft without rotational interference, and also coaxially superposed with the fifth shaft without rotational interference. The second shaft, the sixth shaft, and the seventh shaft may be disposed in parallel with a rotation center axis of the planetary gear set. The second shaft, the fifth shaft, and the sixth shaft may communicate a torque through a first gear set. The third shaft and the seventh shaft may communicate a torque through a second gear set. The seventh shaft and a differential may communicate a torque through a third gear set.

The planetary gear set may be a single pinion planetary gear set having a sun gear, a planet carrier, and a ring gear as the first, second, and third rotation elements.

The plurality of engagement elements may include two clutches selectively connecting a corresponding pair of the first to seventh shafts, and a brake selectively connecting one of the first to seventh shafts to the transmission housing.

The two clutches may include a first clutch disposed between the first shaft and the fourth shaft, and a second clutch disposed between the sixth shaft and the seventh shaft. The brake may be disposed between the fourth shaft and the transmission housing.

The first gear set may include a first gear fixedly connected to the second shaft, a second gear fixedly connected to the sixth shaft and externally gear-meshed with the first gear, and a third gear fixedly connected to the fifth shaft and externally gear-meshed with the second gear. The second gear set may include a fourth gear fixedly connected to the third shaft, and a fifth gear fixedly connected to the seventh shaft and externally gear-meshed with the fourth gear. The third gear set may include an output gear fixedly connected to the seventh shaft, and a final reduction gear fixedly connected to the differential and externally gear-meshed with the output gear.

The exemplary power transmission apparatus may further include first and second motor/generators as auxiliary power sources.

The first motor/generator may be disposed on the first shaft such that a first rotor of the first motor/generator is fixedly connected to the first shaft. The second motor/generator may be disposed in parallel with the second shaft such that an eighth shaft connected to a second rotor of the second motor/generator is externally gear-meshed with the second shaft.

The first shaft may be selectively connectable to an engine output side interposing an engine clutch.

The eighth shaft may include a sixth gear externally gear-meshed with the first gear on the second shaft.

As described above, a power transmission system of a vehicle according to an exemplary embodiment of the present invention realizes forward shift-ranges and a reverse speed by combining a belt-type continuously variable transmission, one planetary gear set, three engagement elements, and a plurality of external gears.

Furthermore, a wide speed ratio span may be achieved by employing a planetary gear set and two pairs of external gears and by altering number of teeth of gears and controlling pulley ratio.

Furthermore, power delivery efficiency may be enhanced by achieving a large speed ratio with reduced pulley size.

Furthermore, a hydraulic pressure apparatus to control a CVT device may be downsized due to downsizing of pulleys.

A power transmission system of a vehicle according to an exemplary embodiment of the present invention may realize a form of a hybrid electric vehicle by including a motor/generator.

Furthermore, effects which may be obtained or expected from exemplary embodiments of the present invention are directly or suggestively described in the following detailed description. That is, various effects expected from exemplary embodiments of the present invention will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present application will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

In the following description, dividing names of components into first, second and the like is to divide the names because the names of the components are the same as each other and an order thereof is not particularly limited.

Figure 1:
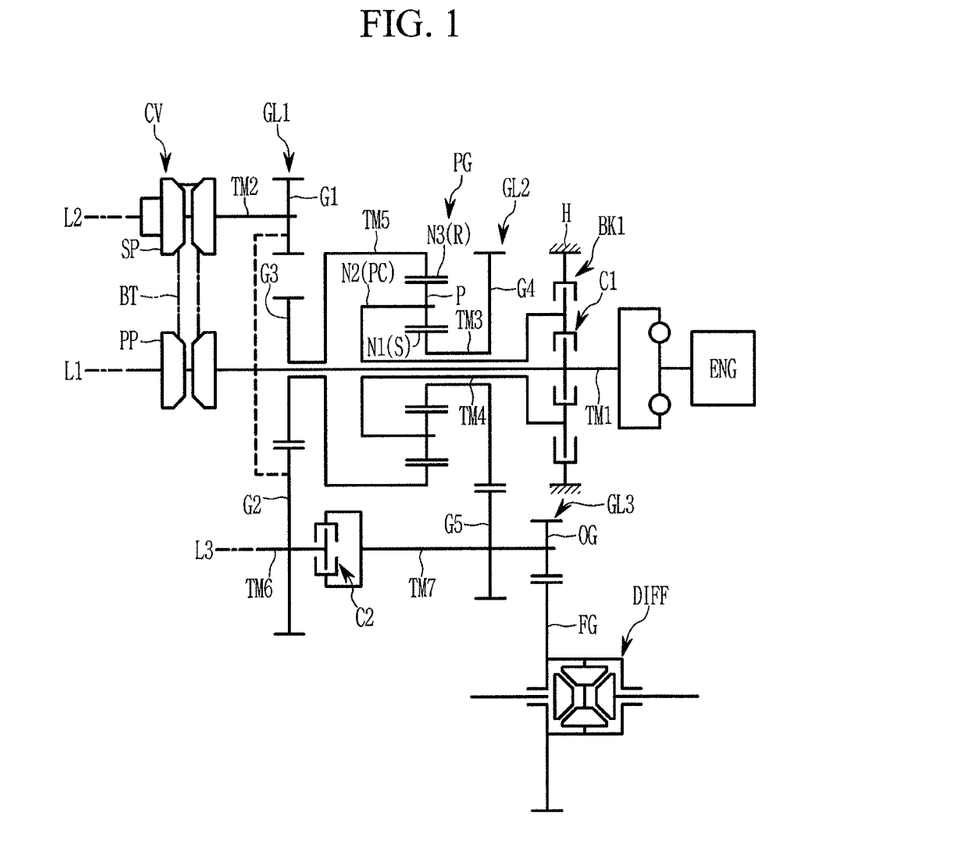
FIG. 1 is a schematic diagram of a power transmission system of a vehicle according to various exemplary embodiments of the present invention.

FIG. 1 is a schematic diagram of a power transmission system of a vehicle according to various exemplary embodiments of the present invention.

As shown in FIG. 1, a power transmission system of a vehicle according to various exemplary embodiments of the present invention receives an input torque from an engine ENG as a power source, and includes a continuously variable transmission (CVT) device CV, a planetary gear set PG outputting an adjusted torque from torques of the engine and the CVT device CV, first to seventh shafts TM1 to TM7, and three engagement elements C1, C2, and BK1. Torques from the CVT device CV and the planetary gear set PG may be transmitted to a differential DIFF through the seventh shaft TM7.

The engine ENG is a primary power source and various kind of typical engines such as a gasoline engine or a diesel engine that utilizes fossil fuel.

The CVT device CV includes a primary pulley PP connected to a drive side, a secondary pulley SP connected to a driven side, and a belt BT connecting the primary pulley PP and secondary pulley SP.

The primary pulley PP and the secondary pulley SP respectively include a fixed sheave and a moving sheave, and the moving sheave applies lateral pressure to the belt BT while varying diameters of the pulleys PP and SP to achieve continuously variable gear ratio.

The planetary gear set PG is a single pinion planetary gear set, and includes a sun gear S, a planet carrier PC rotatably supporting a plurality of pinion gear P externally gear-meshed with the sun gear S, and a ring gear R internally gear-meshed with the plurality of pinion gear P engaged with the sun gear S. The sun gear S acts as a first rotation element N1, the planet carrier PC acts as a second rotation element N2, and the ring gear R acts as a third rotation element N3.

The seven shafts TM1 to TM7 are disposed as follows.

The first shaft TM1 is connected to an output side of the engine ENG and fixedly connected to the primary pulley PP.

Thus, the first shaft TM1 acts as an input shaft to transmit the torque of the engine ENG to the primary pulley PP.

The second shaft TM2 is fixedly connected to the secondary pulley SP, and disposed in parallel with the first shaft TM1. The primary pulley PP and the secondary pulley SP are interconnected by the belt BT.

The third shaft TM3 is fixedly connected to the sun gear S, i.e., the first rotation element N1, of the planetary gear set PG.

The fourth shaft TM4 is fixedly connected to the planet carrier PC, i.e., the second rotation element N2, of the planetary gear set PG and selectively connectable to the first shaft TM1 and a transmission housing H.

Therefore, the fourth shaft TM4 selectively acts as an input element by being connected to the first shaft TM1, and selectively acts as a fixed element by being connected to the transmission housing H.

The fifth shaft TM5 is fixedly connected to the ring gear R, i.e., the third rotation element N3, of the planetary gear set PG.

The sixth shaft TM6 is an intermediate shaft between the second shaft TM2 and the fifth shaft TM5, and externally gear-meshed with the second shaft TM2 and the fifth shaft TM5, respectively.

Therefore, the sixth shaft TM6 acts as an idle shaft that transmits the torque of the second shaft TM2 to the fifth shaft TM5.

The seventh shaft TM7 is disposed at a same axis with the sixth shaft TM6, externally gear-meshed with the third shaft TM3, and selectively connectable to the sixth shaft TM6.

Therefore, the seventh shaft TM7 acts as an output element that transmits the torque of the third shaft TM3 and the sixth shaft TM6 to a final reduction gear FG of the differential DIFF.

As shown in FIG. 1, the first shaft TM1 is coaxially superposed with the third shaft TM3 and the fourth shaft TM4 without rotational interference, and also coaxially superposed with the fifth shaft TM5 without rotational interference, Each of the seven shafts TM1 to TM7 may be a rotation member which is fixedly connected to the input and output shafts and rotation elements of the planetary gear set PG or may be a rotation member that selectively interconnects a rotation element to the transmission housing H, or may be a fixed member fixed to the transmission housing H.

In the disclosure, when two or more members are described to be "fixedly connected", where each of the members may be any of a shaft, an input shaft, an output shaft, a rotation member, and a transmission housing, it means that the fixedly connected members always rotate at a same speed.

When two or more members are described to be "selectively connectable" by an engagement element, it means that the selectively connectable members rotate separately when the engagement element is not engaged, and rotates at a same speed when the engagement element is engaged.

It may be understood that in the case that a member is "selectively connectable" with a transmission housing by an engagement element, the member may be stationary when the engagement element is engaged.

Three engagement elements of first clutch and second clutch C1 and C2 and a brake BK1 are disposed between the nine shafts TM1 to TM9 and the transmission housing H, to form selective connections.

The first clutch C1 is disposed between the first shaft TM1 and the fourth shaft TM4, and selectively interconnects the first shaft TM1 and the fourth shaft TM4, controlling power delivery therebetween.

The second clutch C2 is disposed between the sixth shaft TM6 and the seventh shaft TM7, and selectively connects the sixth shaft TM6 and the seventh shaft TM7, controlling power delivery therebetween.

The brake BK1 is disposed between the fourth shaft TM4 and the transmission housing H, and selectively connects the fourth shaft TM4 to the transmission housing H.

The engagement elements of the first clutch and second clutch C1 and C2 and the brake BK1 may be realized as multi-plate hydraulic pressure friction devices that are frictionally engaged by hydraulic pressure, however, it may not be understood to be limited thereto, since various other configuration that are electrically controllable may be available.

The first shaft TM1 to seventh shaft TM7 are disposed on first, second, and third axes L1, L2, and L3 that are in parallel to one another.

The first axis L1 is a rotation center axis of the planetary gear set PG. The engine ENG, the planetary gear set PG, and the primary pulley PP of the CVT device CV are the first axis L1 in the described order.

Around an axis of the first shaft TM1 connected to the output side of the engine ENG, the fourth shaft TM4 and the fifth shaft TM5 are coaxially superposed with the first shaft TM1 without rotational interference, and the third shaft TM3 is coaxially superposed with the fourth shaft TM4 without rotational interference.

The second axis L2 is an axis formed in parallel with the first axis L1. The second shaft TM2 fixedly connected to the secondary pulley SP of the CVT device CV is disposed along the second axis L2.

The third axis L3 is an axis formed in parallel with the second axis L2. The sixth shaft TM6 acting as an idle shaft and the seventh shaft TM7 acting as an output shaft are disposed along the third axis L3.

The shafts disposed along the axes L1, L2, and L3 are externally gear-meshed in appropriate pairs. The second, fifth, and sixth shafts TM2, TM5, and TM6 are externally gear-meshed with each other by a first gear set GL1. The third and seventh shafts TM3 and TM7 are externally gear-meshed with each other by a second gear set GL2. The seventh shaft TM7 and the differential DIFF are externally gear-meshed with each other by a third gear set GL3.

The first gear set GL1 includes a first gear G1 fixedly connected to the second shaft TM2, a second gear G2 fixedly connected to the sixth shaft TM6 and externally gear-meshed with the first gear G1, and a third gear G3 fixedly connected to the fifth shaft TM5 and externally gear-meshed with the second gear G1.

The first gear set GL1 transmits the torque of the second shaft TM2 adjusted by the pulley ratio of the CVT device CV to the fifth shaft TM5 through the sixth shaft TM6. In the instant case, the first gear set GL1 may act as a transfer gear set that transmits the forward torque of the second shaft TM2 to a forward torque of the fifth shaft TM5, according to gear ratios of the first, second, and third gears G1, G2, and G3.

The second gear set GL2 includes a fourth gear G4 fixedly connected to the third shaft TM3, and a fifth gear G5 fixedly connected to the seventh shaft TM7 and externally gear-meshed with the fourth gear G4.

The second gear set GL2 transmits the torque of the third shaft TM3 to the seventh shaft TM7. In the instant case, the second gear set GL2 may act as a transfer gear set that transmits the torque of the third shaft TM3 to the seventh shaft TM7, in a reversed rotation, according to the gear ratio of the fourth and fifth gears G4 and G5.

The third gear set GL3 includes an output gear OG fixedly connected to the seventh shaft TM7, and the final reduction gear FG fixedly connected to the differential DIFF and externally gear-meshed with the output gear OG.

The third gear set GL3 transmits the torque of the seventh shaft TM7 to the differential DIFF. In the instant case, the third gear set GL3 may act as a transfer gear set that transmits the torque of the seventh shaft TM7 to the differential DIFF, in a reversed rotation, according to the gear ratio of the output gear OG and the final reduction gear FG.

Gear ratios between the first, second, third, fourth, and fifth gears G1, G2, G3, G4, and G5, the output gear OG, and the final reduction gear FG may be set according to design factors such as engine and vehicle specifications.

Figure 2:
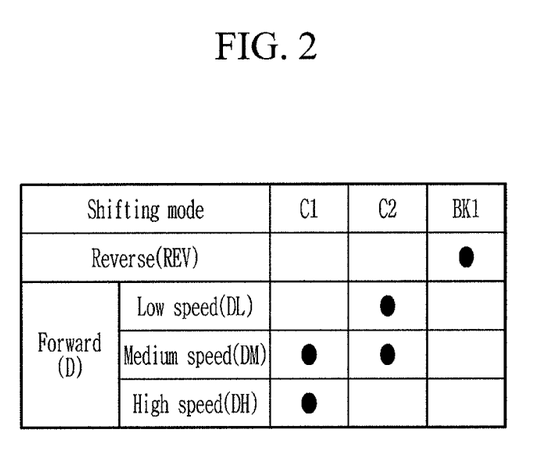
FIG. 2 is an operation chart of a power transmission system of a vehicle according to various exemplary embodiments of the present invention.

FIG. 2 is an operation chart of a power transmission system of a vehicle according to various exemplary embodiments of the present invention.

As shown in FIG. 2, a power transmission system of a vehicle according to various exemplary embodiments may realize four driving modes by operating the brake BK1 and two clutches C1 and C2.

[Reverse Speed REV]

In the reverse speed REV mode, the brake BK1 is operated.

The torque of the engine ENG is transmitted to the CVT device CV through the first shaft TM1. The torque received at the CVT device CV is shifted by the pulley ratio between the primary pulley PP and the secondary pulley SP, and then transmitted to the second shaft TM2. The torque of the second shaft TM2 is transmitted to the fifth shaft TM5 through the first gear set GL1. The torque of the fifth shaft TM5 is then inputted to the third rotation element N3 (i.e., the ring gear R) of the planetary gear set PG fixedly connected to the fifth shaft TM5, and thus, the third rotation element N3 (i.e., the ring gear R) acts as an input element of the planetary gear set PG.

By the operation of the brake BK1, the fourth shaft TM4 is connected to the transmission housing H, and therefore, the second rotation element N2 (i.e., the pinion carrier PC) of the planetary gear set PG fixedly connected to the fourth shaft TM4 becomes stationary, acting as a fixed element. Since the third rotation element N3 (i.e., the ring gear R) acts as an input element and the second rotation element N2 (i.e., the pinion carrier PC) acts as a fixed element, the first rotation element N1 (i.e., the sun gear S) acts as an output element and outputs a reverse torque to the third shaft TM3.

The torque of the third shaft TM3 is transmitted to the differential DIFF sequentially through the second and third gear sets GL2 and GL3, and thereby the reverse speed REV mode is realized.

[Forward Low Speed DL]

In the forward low speed DL mode, the second clutch C2 is operated.

The torque of the engine ENG is transmitted to the CVT device CV through the first shaft TM1. The torque received at the CVT device CV is shifted by the pulley ratio between the primary pulley PP and the secondary pulley SP, and then transmitted to the second shaft TM2. The torque of the second shaft TM2 is transmitted to the fifth shaft TM5 through the first gear set GL1. The torque of the fifth shaft TM5 is then inputted to the third rotation element N3 of the planetary gear set PG fixedly connected to the fifth shaft TM5.

The torque of the second shaft TM2 is transmitted to the sixth shaft TM6 through the first gear set GL1, and the torque of the sixth shaft TM6 is then transmitted to seventh shaft TM7, since the sixth shaft TM6 and the seventh shaft TM7 are interconnected by the operation of the second clutch C2. The torque received at the seventh shaft TM7 is transmitted to the differential DIFF through the third gear set GL3, and thereby the forward low speed DL mode is realized.

In the forward low speed DL mode, shifting operation is realized by a continuously variable shifting of the CVT device CV and by gear ratios of the first gear set GL1 and the third gear set GL3. Thus, shift ratio in the forward low speed DL mode may be continuously varied by controlling the CVT device CV.

The planetary gear set PG receives input torques through the fifth shaft TM5 and through the third shaft TM3 from the seventh shaft TM7 via the second gear set GL2. However, the second rotation element N2 (pinion carrier PC) may freely rotate, and thus, the planetary gear set PG does not affect on forming the forward low speed DL mode.

[Forward Medium Speed DM]

The forward medium speed DM mode is a driving mode that enables the CVT device CV to maintain a predetermined pulley ratio, for example, a lowest pulley ratio (i.e., a highest shift-stage in terms of ordinary fixed shifting stages), available in the forward low speed DL mode.

In the forward medium speed DM mode, the first clutch C1 is controlled to operate when the rotation speed fourth shaft TM4 corresponds to a predetermined rotation speed during the forward low speed DL mode.

Under the condition that the second clutch C2 is engaged as in the forward low speed DM mode, the rotating speed of the freely rotating fourth shaft TM4 varies according to the pulley ratio of the CVT device CV. Thus, while varying the pulley ratio of the CVT device CV in the forward low speed DM mode according to increasing vehicle speed, the rotation speed fourth shaft TM4 may meet the predetermined rotation speed.

The predetermined rotation speed may be set a value that enables the CVT device CV may meet its lowest pulley ratio. For the present purpose, number of teeth of rotation elements of the planetary gear set PG, gear ratios of the first and second gear sets GL1 and GL2, and available pulley ratio of the CVT device CV may be appropriately set.

In the forward medium speed DM mode, the torque of the engine ENG is input to the second rotation element (i.e., the pinion carrier PC) through the fourth shaft TM4, and the planetary gear set PG also receives an input torque at the third rotation element N3 (i.e., the ring gear R), which is adjusted from the engine torque by the CVT device CV and the first gear set GL1. Therefore, speed ratios between rotation elements of the planetary gear set PG have fixed relations in the forward medium speed DM mode.

[Forward High Speed DH]

The forward high speed DH mode is realized by releasing the second clutch C2 at the time when a vehicle speed reaches a predetermined speed while driving in the forward medium speed DM mode.

By releasing the second clutch C2, the speed relation between the sun gear S and the ring gear R that interconnected through the seventh shaft TM7 and the sixth shaft TM6 may be varied. This means that the input speed input to the ring gear R may be varied by controlling the CVT device CV to achieve variable shift ratio in the planetary gear set PG.

Since the pulley ratio of the CVT device CV is the lowest value in the forward medium speed DM mode, the pulley ratio of the CVT device CV may be increased. In the instant case, since the pinion carrier PC rotates at the engine speed, an output speed increases when the input speed of the ring gear R decreases. Therefore, in the forward high speed DH mode, higher shift-ratio may be obtained by adjusting the pulley ratio of the CVT device CV.

The output torque of the planetary gear set PG is output to the third shaft TM3, and the torque of the third shaft TM3 is transmitted to the differential DIFF sequentially through the second and third gear sets GL2 and GL3, realizing the forward high speed DH mode.

In the above description, the forward shift-range is divided into three stages of the forward low speed DL mode, the forward medium speed DM mode, and the forward high speed DH mode. However, it may be understood that each mode does not achieve a fixed shift-ratio, and shift-ratios in the forward driving modes may be continuously varied by operation of the CVT device CV.

Figure 3:
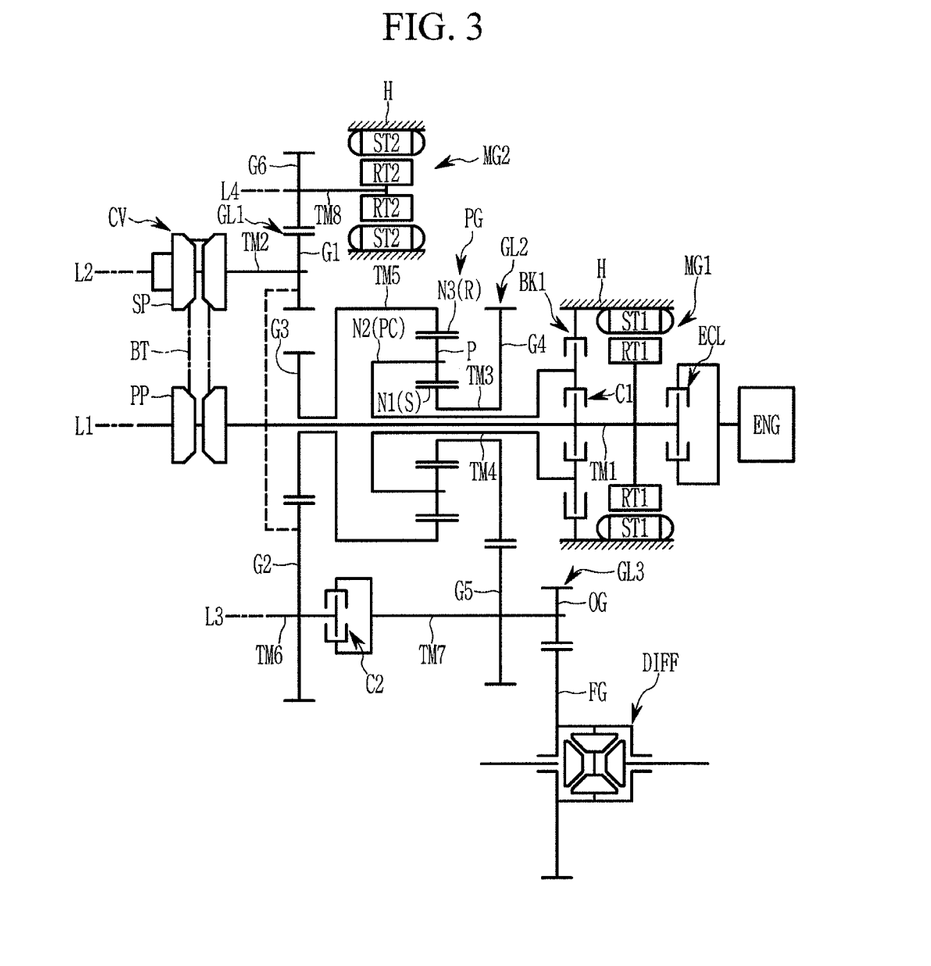
FIG. 3 is a schematic diagram of a power transmission system of a vehicle according to various exemplary embodiments of the present invention.

FIG. 3 is a schematic diagram of a power transmission system of a vehicle according to various exemplary embodiments of the present invention.

As shown in FIG. 3, a power transmission apparatus according to various exemplary embodiments further includes an engine clutch ECL and first and second motor/generators MG1 and MG2, which shows applicability of the present invention to a hybrid vehicle.

The first and second motor/generators MG1 and MG2 are auxiliary power sources, and may act as motors and generators. The first and second motor/generators MG1 and MG2 respectively include first and second stators ST1 and ST2 and first and second rotors RT1 and RT2. The first and second stators ST1 and ST2 are fixed to the transmission housing H. The first, second rotor RT1 and RT2 are disposed radially internal to the first and second stators ST1 and ST2.

The first motor/generator MG1 is disposed along the first axis L1, and the second motor/generator MG2 is disposed along a fourth axis L4 disposed in parallel with the second axis L2.

In more detail, the first motor/generator MG1 is disposed on the first shaft TM1 at a rear of the engine ENG, and the first rotor RT1 is fixedly connected to the first shaft TM1. The first shaft TM1 selectively connectable to the output side of the engine ENG interposing the engine clutch ECL.

An eighth shaft TM8 is disposed on the fourth axis L4, and the second rotor RT is fixedly connected to the eighth shaft TM8. A sixth gear G6 is fixedly formed on the eighth shaft TM8 and externally gear-meshed with the first gear G1.

Therefore, a power transmission apparatus according to various exemplary embodiments enables an electric vehicle mode (EV mode) in which a vehicle is driven by first and second motor/generators MG1 and MG2 without running the engine ENG, a hybrid electric vehicle mode (HEV mode) in which a vehicle is driven by both the engine ENG and the first and second motor/generators MG1 and MG2, and an engine mode in which a vehicle is driven by only the engine ENG.

As described above, a power transmission system of a vehicle according to an exemplary embodiment of the present invention realizes forward shift-ranges and a reverse speed by combining a belt-type continuously variable transmission, one planetary gear set, three engagement elements, and a plurality of external gears.

Furthermore, a wide speed ratio span may be achieved by employing a planetary gear set and two pairs of external gears and by altering number of teeth of gears and controlling pulley ratio.

Furthermore, power delivery efficiency may be enhanced by achieving a large speed ratio with reduced pulley size.

Furthermore, a hydraulic pressure apparatus to control a CVT device may be downsized due to downsizing of pulleys.

A power transmission system of a vehicle according to an exemplary embodiment of the present invention may realize a form of a hybrid electric vehicle by including a motor/generator.

For convenience in explanation and accurate definition in the appended claims; the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A power transmission system of a vehicle, the power transmission system comprising:
    a continuously variable transmission device having a primary pulley and a secondary pulley that are interconnected by a belt to continuously vary a pulley ratio therebetween;
    a planetary gear set having a first rotation element, a second rotation element engaged with the first rotation element, and a third rotation element engaged with the second rotation element;
    a first shaft fixedly connected to an engine output side of an engine and fixedly connected to the primary pulley;
    a second shaft fixedly connected to the secondary pulley;
    a third shaft fixedly connected to the first rotation element;
    a fourth shaft fixedly connected to the second rotation element and selectively connectable to the first shaft and a transmission housing;
    a fifth shaft fixedly connected to the third rotation element;
    a sixth shaft gear-meshed with the second shaft;
    a seventh shaft gear-meshed with the third shaft and selectively connectable to the sixth shaft; and
    a plurality of engagement elements, each disposed between at least a corresponding pair of the first to seventh shafts or between the transmission housing and a corresponding shaft among the first to seventh shafts,
    wherein a first portion of the first shaft is coaxially superposed with the third shaft and the fourth shaft without rotational interference therebetween, and a second portion of the first shaft is coaxially superposed with the fifth shaft without rotational interference therebetween,
    wherein the second shaft, the sixth shaft, and the seventh shaft are disposed in parallel with the first shaft,
    wherein the second shaft, the fifth shaft, and the sixth shaft communicate a torque through a first gear set,
    wherein the third shaft and the seventh shaft communicate a torque through a second gear set,
    wherein the seventh shaft and a differential communicate a torque through a third gear set.

2. The power transmission system of claim 1, wherein the planetary gear set is a single pinion planetary gear set having a sun gear, a planet carrier, and a ring gear as the first rotation element, the second rotation element, and the third rotation element, respectively.

3. The power transmission system of claim 1, wherein the plurality of engagement elements includes:
    two clutches selectively connecting the at least a corresponding pair of the first to seventh shafts; and
    a brake selectively connecting one of the first to seventh shafts to the transmission housing.

4. The power transmission system of claim 3, wherein the two clutches includes:
- a first clutch mounted between the first shaft and the fourth shaft; and
- a second clutch mounted between the sixth shaft and the seventh shaft,
- wherein the brake is disposed between the fourth shaft and the transmission housing.

5. The power transmission system of claim 1, wherein the first gear set includes:
- a first gear fixedly connected to the second shaft;
- a second gear fixedly connected to the sixth shaft and gear-meshed with the first gear; and
- a third gear fixedly connected to the fifth shaft and gear-meshed with the second gear.

6. The power transmission system of claim 1, wherein the third gear is rotatably mounted on the first shaft.

7. The power transmission system of claim 1, wherein the second gear set includes:
- a fourth gear fixedly connected to the third shaft; and
- a fifth gear fixedly connected to the seventh shaft and gear-meshed with the fourth gear.

8. The power transmission system of claim 7, wherein the fourth gear is rotatably mounted on the fourth shaft.

9. The power transmission system of claim 1, wherein the third gear set includes:
- an output gear fixedly connected to the seventh shaft; and
- a final reduction gear fixedly connected to the differential and gear-meshed with the output gear.

10. The power transmission system of claim 1, further including first and second motor/generators as auxiliary power sources.

11. The power transmission system of claim 10,
- wherein the first motor/generator is disposed on the first shaft, a first rotor of the first motor/generator being fixedly connected to the first shaft; and
- wherein the second motor/generator is disposed in parallel with the second shaft, an eighth shaft being fixedly connected to a second rotor of the second motor/generator and gear-meshed with the second shaft.

12. The power transmission system of claim 11, wherein the first motor/generator is disposed on the first shaft between the engine and the plurality of engagement elements.

13. The power transmission system of claim 11, wherein the first shaft is selectively connectable to the engine output side interposing an engine clutch.

14. The power transmission system of claim 13, wherein the first motor/generator is disposed on the first shaft between the engine clutch and the plurality of engagement elements.

15. The power transmission system of claim 11, wherein the eighth shaft includes a sixth gear gear-meshed with the first gear fixed on the second shaft.

16. The power transmission system of claim 11, wherein the first shaft is coaxially disposed inside of the fourth shaft and the fourth shaft is coaxially disposed inside of the third shaft.

* * * * *